US011383393B2

(12) United States Patent
O'Connor et al.

(10) Patent No.: US 11,383,393 B2
(45) Date of Patent: Jul. 12, 2022

(54) MECHANISM FOR EXCHANGING CONCENTRIC SUCTION CUPS

(71) Applicant: Amazon Technologies, Inc., Seattle, WA (US)

(72) Inventors: Michael James O'Connor, Charlestown, MA (US); Ennio Claretti, Somerville, MA (US); Ryan Frederick Anderson, North Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 397 days.

(21) Appl. No.: 16/709,875

(22) Filed: Dec. 10, 2019

(65) Prior Publication Data

US 2020/0189123 A1 Jun. 18, 2020

Related U.S. Application Data

(63) Continuation of application No. 15/824,308, filed on Nov. 28, 2017, now Pat. No. 10,500,738.

(51) Int. Cl.
| | |
|---|---|
| *B25B 11/00* | (2006.01) |
| *B25J 15/06* | (2006.01) |
| *B25J 18/02* | (2006.01) |
| *B25J 15/00* | (2006.01) |

(52) U.S. Cl.
CPC ....... *B25J 15/0666* (2013.01); *B25J 15/0061* (2013.01); *B25J 15/0616* (2013.01); *B25J 18/025* (2013.01); *Y10S 901/40* (2013.01)

(58) Field of Classification Search
CPC .... B25B 11/00; B25B 11/005; B25J 15/0061; B25J 15/0666; B25J 18/025
See application file for complete search history.

(56) References Cited

U.S. PATENT DOCUMENTS

| | | |
|---|---|---|
| 4,728,135 A | 3/1988 | Sugimura et al. |
| 5,374,091 A | 12/1994 | Gore et al. |
| 5,542,726 A | 8/1996 | Ozawa |
| 8,814,153 B2 | 8/2014 | Toncelli |
| 10,500,738 B2 * | 12/2019 | O'Connor ............ B25J 15/0616 |
| 2006/0231995 A1 | 10/2006 | Wang et al. |
| 2013/0221589 A1 | 8/2013 | Mandler |

(Continued)

FOREIGN PATENT DOCUMENTS

| | | |
|---|---|---|
| DE | 69409135 T2 | 8/1998 |
| EP | 0607901 A1 | 7/1994 |

(Continued)

OTHER PUBLICATIONS

International Patent Application No. PCT/US2018/062875; Int'l Search Report and the Written Opinion; dated Apr. 18, 2019; 14 pages.

(Continued)

*Primary Examiner* — Lee D Wilson
(74) *Attorney, Agent, or Firm* — BakerHostetler

(57) ABSTRACT

A multiple suction cup apparatus for lifting an object includes the capability of exchanging a large and small suction cup. At least one interlock enables the large or small suction cup to be deployed. The interlocks include passive interlocks, such as ball detents and conventional magnets, and active interlocks, such as a twist lock and electronic actuated magnets.

20 Claims, 8 Drawing Sheets

(56) References Cited

U.S. PATENT DOCUMENTS

2015/0214090 A1   7/2015  Jin et al.
2019/0160691 A1*  5/2019  O'Connor ............ B25J 15/0061
2020/0189123 A1*  6/2020  O'Connor .............. B25J 18/025

FOREIGN PATENT DOCUMENTS

| GB | 1193921 A | 6/1970 |
| JP | S63-129698 A | 6/1988 |
| JP | S63-306890 A | 12/1988 |
| JP | H03-142187 A | 6/1991 |
| WO | WO 2000/052986 A1 | 9/2000 |

OTHER PUBLICATIONS

International Patent Application No. PCT/US2018/062875; Int'l Preliminary Report on Patentability; dated Jun. 11, 2020; 8 pages.

* cited by examiner

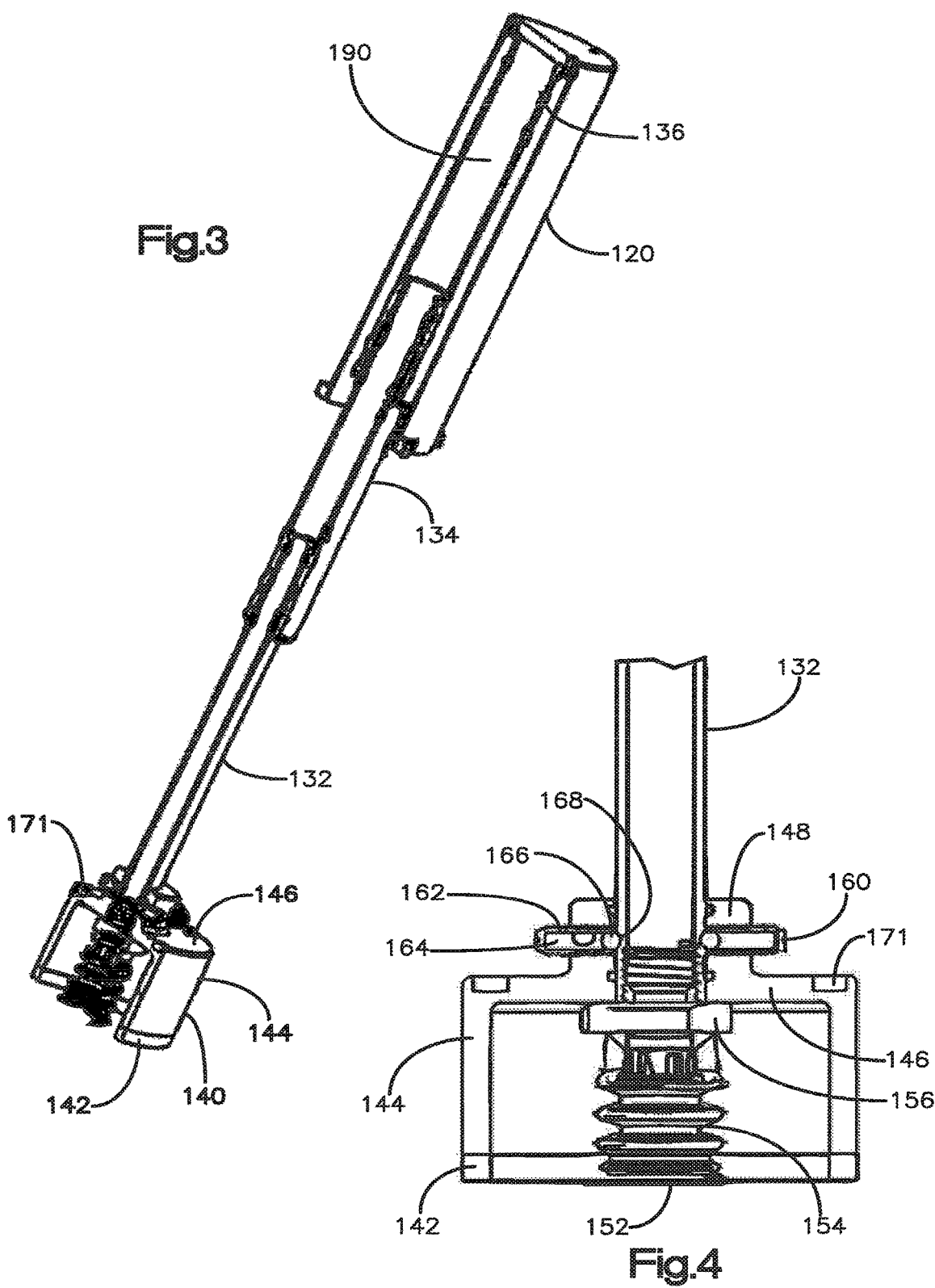

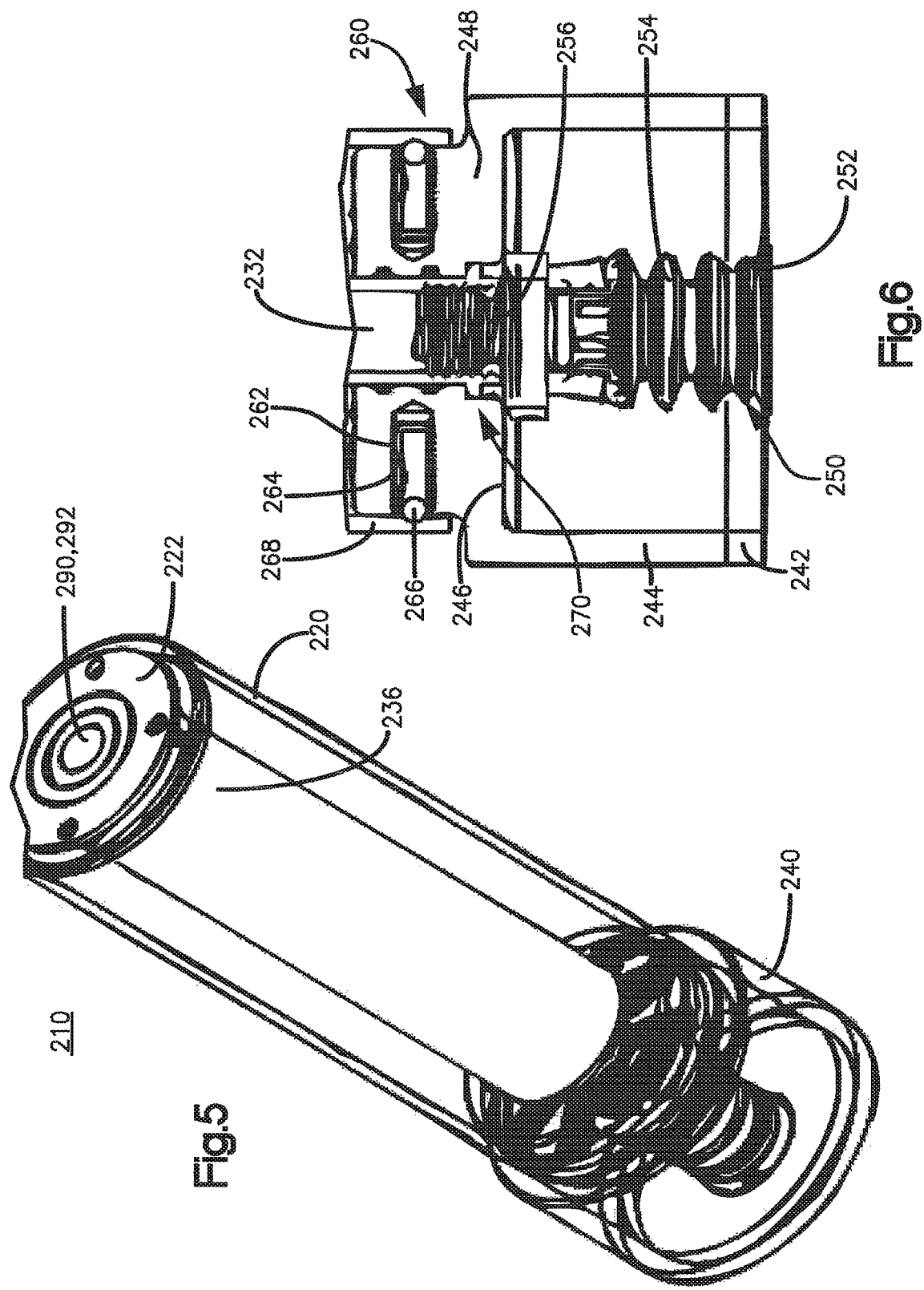

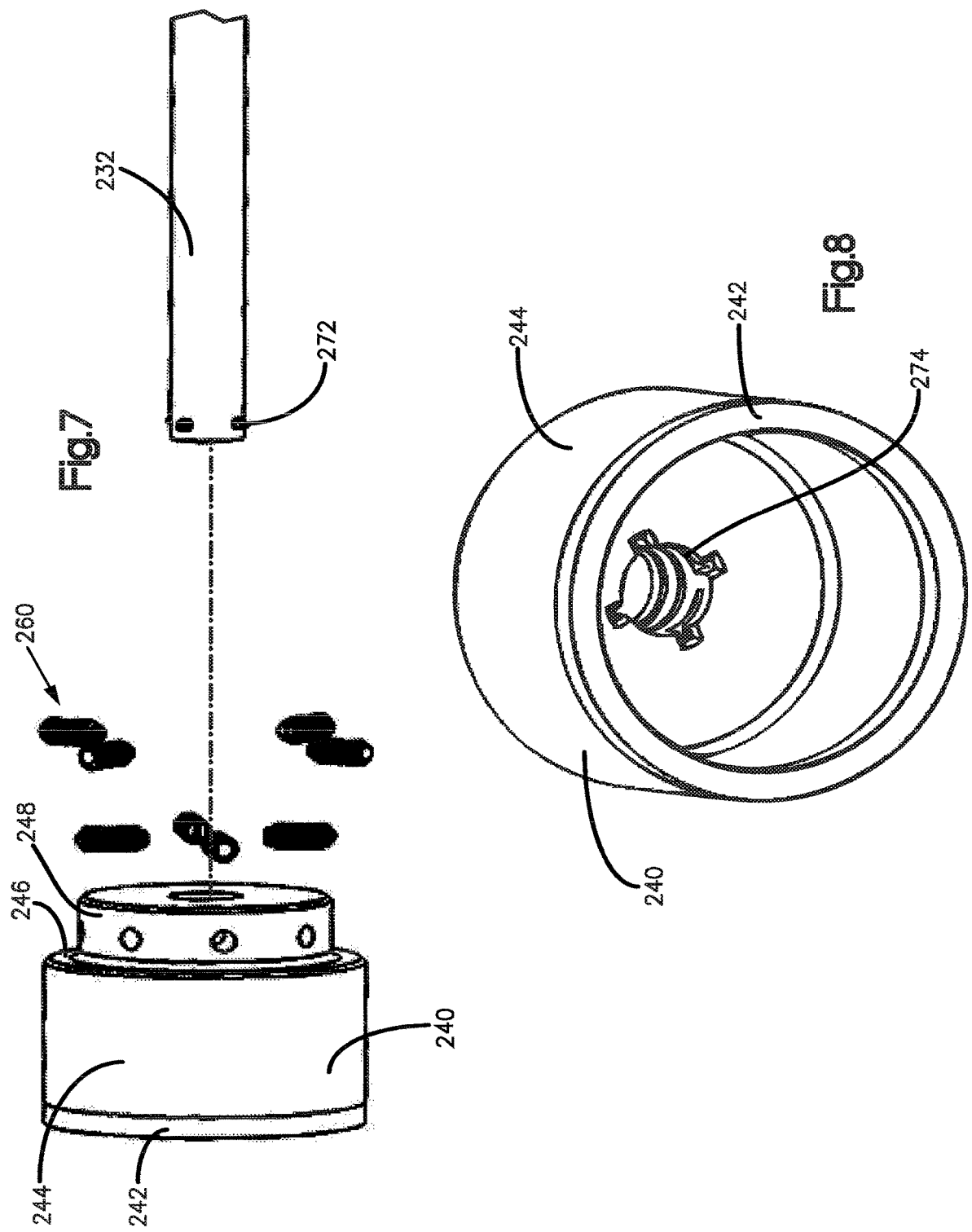

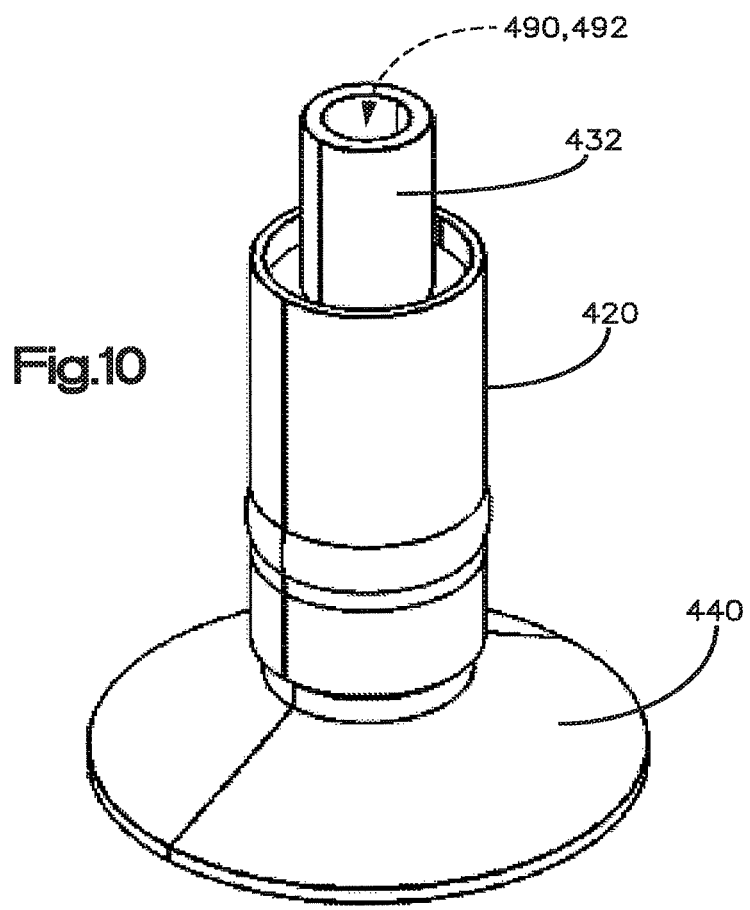
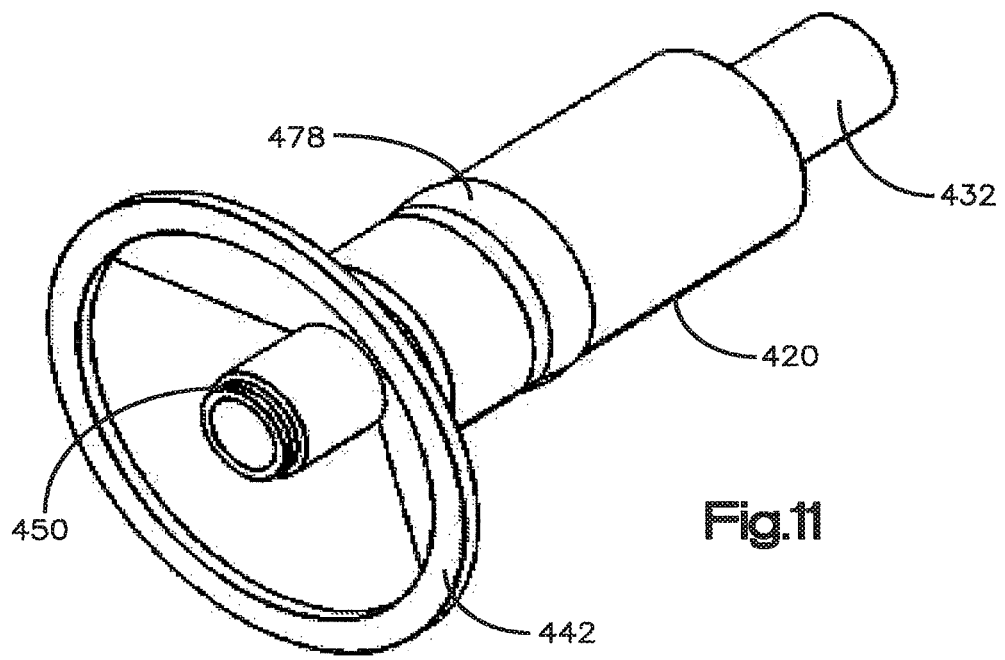

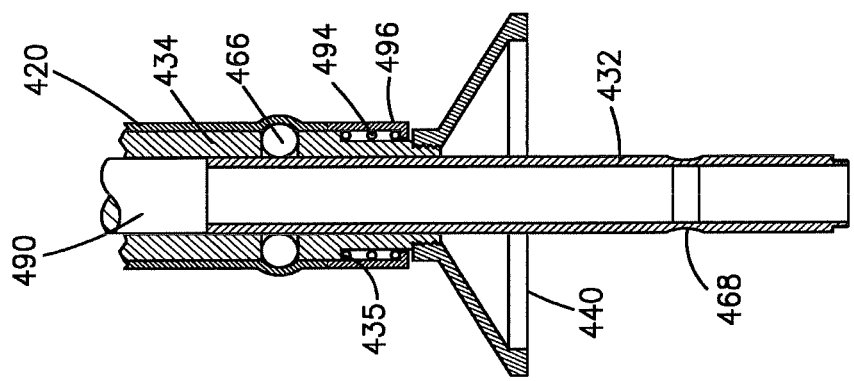
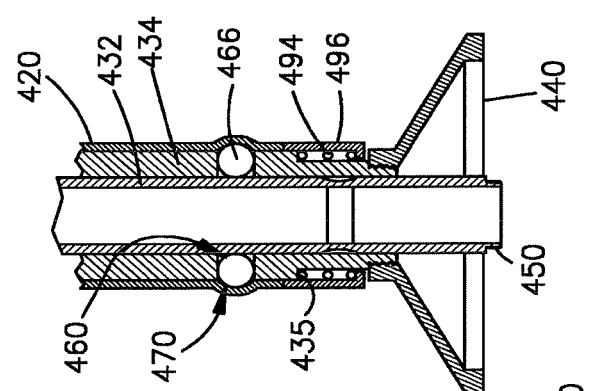
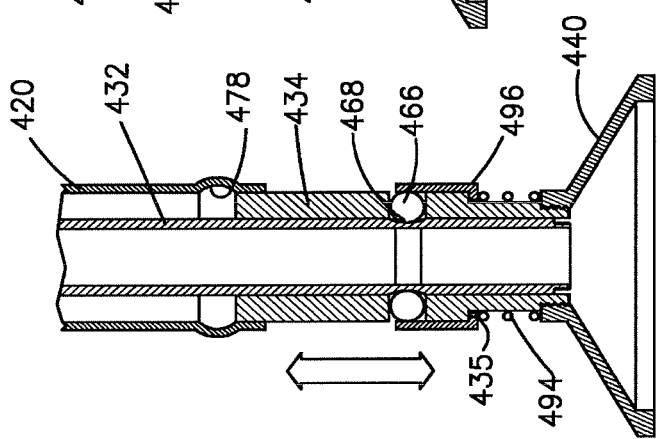
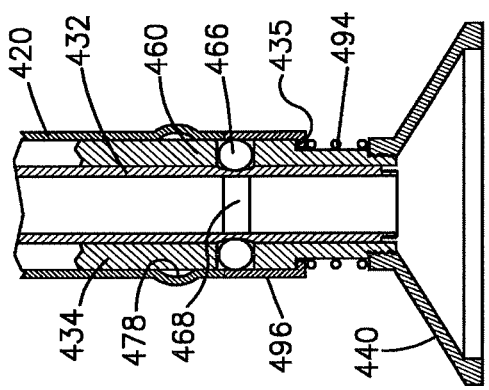

MECHANISM FOR EXCHANGING CONCENTRIC SUCTION CUPS

BACKGROUND

The present invention is related to robotics, and more particularly to a robotic mechanism for lifting objects using suction cups.

Automation for lifting objects, such as those of the type that employ suction cups for lifting objects under a vacuum, is used in many facilities. The lifting capacity of a suction cup is related to vacuum pressure and effective area of the suction cup. In facilities in which the same size objects are repeatably engaged by suction cups, the suction cup, end effector, and other components may be designed according to straightforward principles.

In facilities in which objects of different sizes and weights are lifted, smaller sized suction cups may be incapable of lifting larger or heavier objects. And larger sized suction cups may have a diameter too large to seal around smaller objects.

BRIEF DESCRIPTION OF THE DRAWINGS

FIG. 3 is a perspective, cross sectional view of the mechanism of FIG. 2;

FIG. 4 is a cross sectional view of an enlarged portion of the mechanism shown in FIG.

FIG. 5 is a perspective view of a second embodiment mechanism for exchanging and deploying suction cups, illustrating a large suction cup attached to a housing by a twist lock, with the components shown transparent;

FIG. 6 is an enlarged cross sectional view of a portion of the assembly of FIG. 5

FIG. 7 is an exploded view of the some components of the embodiment of FIG. 5, including the outer suction cup, inner tube, and ball detents;

FIG. 8 is a perspective view of the outer suction cup detached from the assembly;

FIG. 10 is a top perspective view of a fourth embodiment mechanism for exchanging and deploying suction cups, with the inner suction cup removed for clarity;

FIG. 11 is a bottom perspective view of the embodiment of FIG. 10;

FIG. 12 is a cross sectional view of the embodiment of FIG. 10 showing the assembly in a position ready to deploy the outer suction cup;

FIG. 13 is the assembly of FIG. 13 with the outer suction cup deployed;

FIG. 14 is the assembly of FIG. 10 showing the assembly in a position ready to deploy the inner suction cup; and FIG. 15 is the assembly of FIG. 13 with the inner suction cup deployed.

DETAILED DESCRIPTION OF ILLUSTRATIVE EMBODIMENTS

Figure 1:
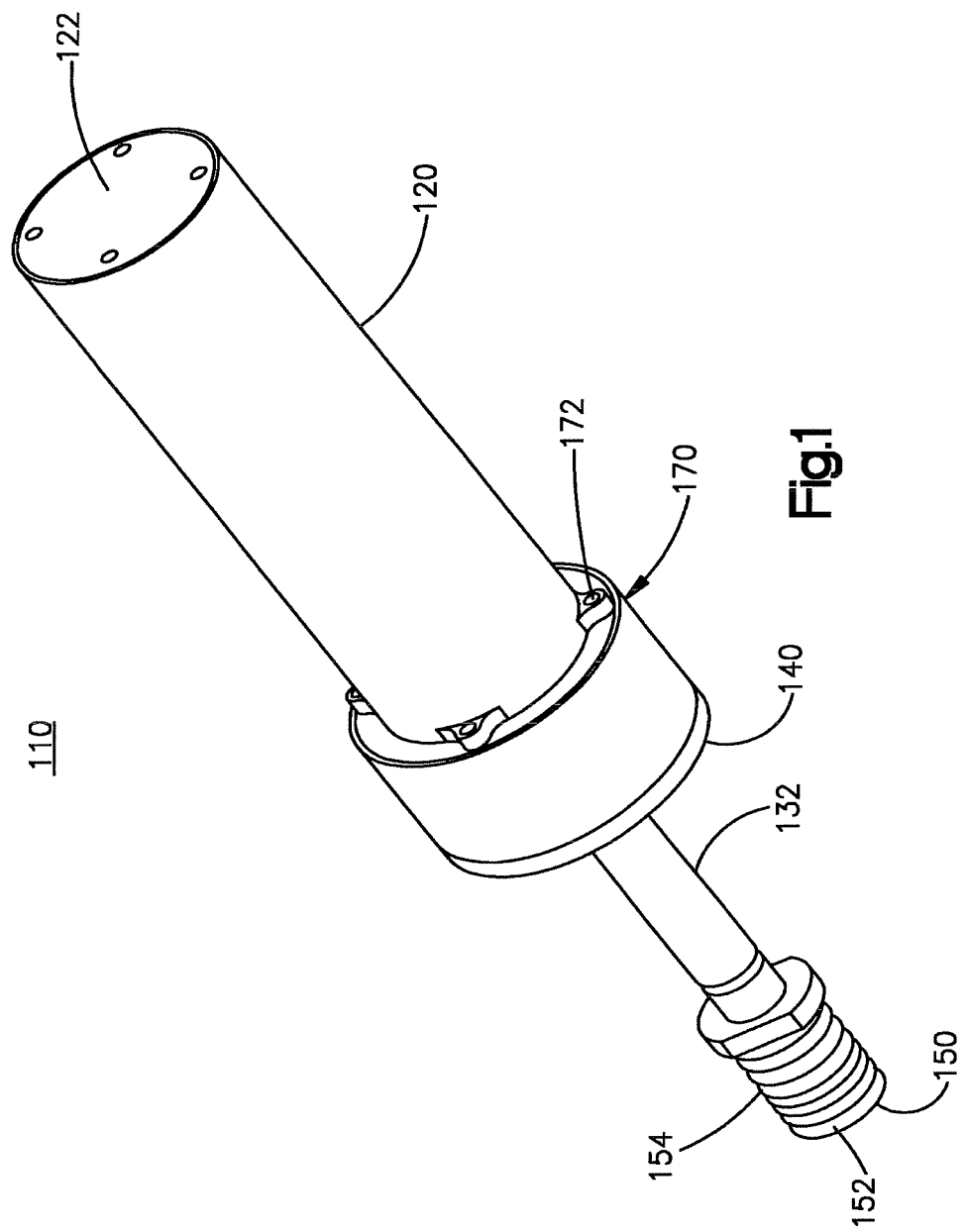
FIG. 1 is a perspective view of a first embodiment mechanism for exchanging and deploying suction cups, illustrating a small suction cup deployed and a large suction cup spaced apart from the small suction cup and attached to a housing by magnets.

In general, a mechanism for exchanging concentric suction cups uses a single linear telescoping actuator to exchange and deploy two (or more) different sizes of suction cups. In this regard, the mechanisms allow a larger outer suction cup to attach to a telescoping mechanism to be then used to pick an object, such as an item in a fulfillment center, and also allow the option to deploy a smaller diameter suction cup to engage and pick the object. The large suction cup can be used for relatively large objects and the small suction cup may be used for relatively small objects.

The mechanisms disclosed herein preferably secure the outer suction cup to a telescoping mechanism or, alternatively, to a housing which is retained at a fixed distance from the housing mounting. The telescoping mechanism also has a fixed smaller suction cup which is used to pick items when then larger suction cup is secured to the outside housing. The housing may be mounted to an automated system, such as without limitation an end effector or any type, a robotic arm, a gantry, a mounting that is fixed in space, or any other structure.

FIGS. 1 through 4 illustrate a first embodiment of an assembly or mechanism 110 to exchange two suction cups, such that either a large suction cup or small suction cup can be deployed as needed. Assembly 110 includes a tubular housing 120 having a mounting end 122 at its proximal end, which is opposite the distal end at which the suction cups are located. Mounting end 122 is adapted for attaching preferably to an end effector (not shown) or to any other structure, according to the particular parameters of the application. An inner telescoping tube assembly 130 includes at least one inner tube 132. In the embodiment shown in FIG. 3, inner tube 132 is the distal one of telescoping tubes, which also include an intermediate tube 134 that is concentric with and outboard of inner telescoping tube 132, and a proximal tube 136 that is concentric with and outboard of intermediate tube 134. In the embodiment of the figures, proximal tube 136 is fixed relative to housing 120, and may house the actuator(s) described below.

Preferably, a linear actuator, shown schematically by reference numeral 190 in FIG. 3, has a proximal end that is affixed relative to housing 120 and a distal end that is operatively coupled to inner tube 132 such that actuator 190 can extend and then retract the suction cups at the distal end of inner tube 132. Actuator 190 can be a pneumatic actuator (preferred), a hydraulic actuator, a mechanical actuator such as an ACME screw, or any other mechanism capable of extension and retraction upon being energized, without limitation.

Assembly 110 includes an outer suction cup 140 and an inner suction cup 150. Inner suction cup 150 has a smaller diameter than outer suction cup 140 and is nestable or retractable within outer suction cup 140. In the embodiment shown in the figures, outer suction cup 140 is cup-like and includes a resilient contact ring 142, a cylindrical or somewhat conical sidewall 144, an end wall 146, and a ring 148 (FIG. 4). Inner suction cup 150 is preferably affixed to a distal end of distal tube 132, such as by screw threads or like means. Inner suction cup 150 includes a contact ring 152, a bellows-like sidewall 154, and threads 156 or other attachment means.

Assembly 110 has a pair of interlocks 160 and 170 to exchange or control the suction cups by coupling or engaging outer suction cup 140 with the distal end of inner tube 132 and, alternatively, with housing 120. In this regard, the phrase "engaged with the housing" as used herein refers to connecting the outer suction cup 140 to a fixed structure. Moreover, the term "housing" is intended to be broadly interpreted to refer to fixed structure relative to an end effector or the like.

An interlock 160 between outer suction cup 140 and distal inner tube 132 preferably includes ball detents. As illustrated in FIG. 4, each ball detent interlock 160 includes a housing 162 that is threaded into holes in outer cup ring 148, a coil spring 164, a ball 166, and a recess 168 in the outboard surface of inner tube 132. Preferably, several (such as six or eight) detents are located about the circumference of outer suction cup 140. Spring 164 is compressed such that it applies an inward, radial force on ball 166, and in that way presses ball 166 into recess 168. Preferably, recess 168 is a partial sphere to match the surface of ball 166.

An interlock 170 between outer suction cup 140 and housing 120 preferably includes opposing electromagnets including magnets 171 on suction cup 140 and opposing magnets 172 on housing 120. As illustrated in the figures, housing magnets 172 are located on an outer periphery of housing 120; outer suction cup magnets 171 are on a rear side of end wall 146 of outer suction cup 140. Because the electromagnets 171,172 can be energized to engage or disengage suction cup 140 from housing 120, the interlock 170 is referred to herein as an active interlock. It is understood that the active interlock is not limited to electronic actuated magnets, but rather encompasses any type of electric, electro-mechanical, or mechanical interlock, without limitation.

Figure 2:
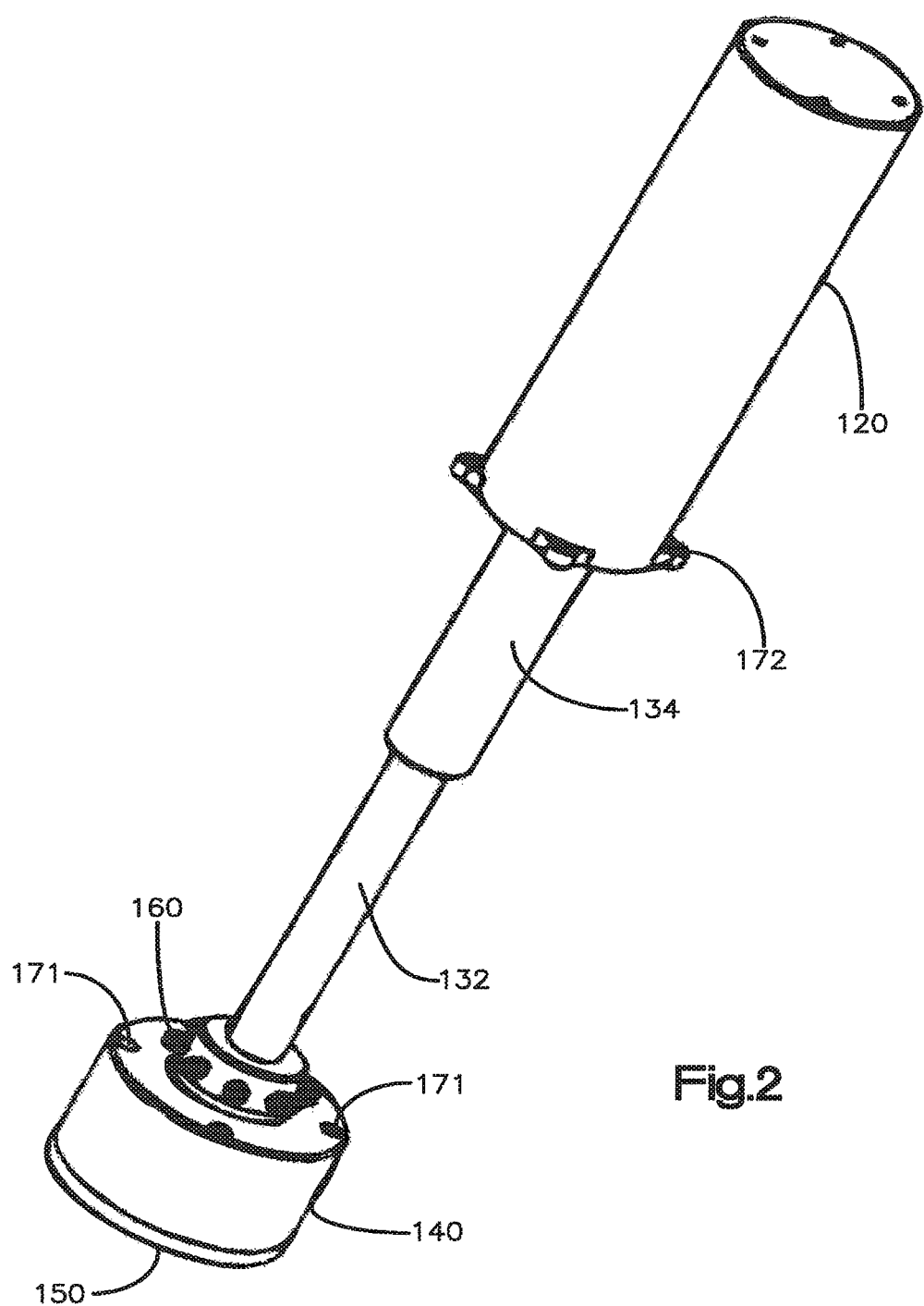
FIG. 2 is a perspective view of the mechanism of FIG. 1, illustrating the large suction cup in a deployed position.

FIG. 1 illustrates magnets 171 engaged with magnets 172 to retain outer suction cup 140 with housing 120 while tube 132 is extended. FIG. 2 illustrates magnets 171 disengaged with magnets 172, and ball detent 160 of outer suction cup 140 engaged with recess 168 of inner tube 132. In operation, upon assembly 110 being positioned relative to an object, a controller (not shown) determines to deploy either the larger outer suction cup 140 or the smaller inner suction cup 150. The controller preferably bases the decision based on information about the object already known to the control system, according to conventional principles that will be understood by persons familiar with automated lifting of objects, such as in a fulfillment center.

Alternatively, magnets 171 and 172 may be conventional magnets that are not electronically actuated such that proximity, as when outer suction cup 140 is located in contact with housing 120, creates an attractive force that retains outer suction cup 140 against housing 120. The operation of the mechanism for exchanging the suction cups employing a pair of passive interlocks is explained more fully below.

If the object is determined by a control system to be small such that inner suction cup 150 is desired to be deployed, electromagnetic interlock 170 engages to retain outer suction cup 140 to housing 120. Because the force required to overcome ball detents 160 is less than the force required to overcome magnet interlock 170, balls 166 release from recesses 168 when actuator 190 extends from its fully retracted position. Thus, inner tube 132 and telescoping tube 134 extend distally from fixed tube 136 and housing 120 while outer suction cup 140 remains affixed to housing 120 to deploy only inner suction cup 150, which is then engaged with an object. Vacuum applied through tubes 132, 134, 136, which is at least partially sealed by suction cup ring 152, enables lifting of the object by engagement with the suction cup. Control of inner suction cup 150 and telescoping tubes 132, 134 preferably are by conventional controlling means, as will be understood by persons familiar with employing automated suction cups for lifting objects.

If the object is determined by a control system to be large such that outer suction cup 140 is desired to be deployed, electromagnetic interlock 170 disengages to free outer suction cup 140 from housing 120. Ball detents 160 retain outer suction cup 140 with the distal end of tube 132 to carry outer suction cup 140 when actuator 190 extends from its fully retracted position. Thus, outer suction cup 140, with inner tube 132 and telescoping tube 134, extend distally from fixed tube 136 to deploy outer suction cup 140, which is then engaged with an object. As illustrated in the figures, inner suction cup 150 also is deployed when outer suction cup 140 is deployed. Because inner suction cup 150 either recessed relative to (or flush with) outer suction cup 140, vacuum applied through tubes 132, 134, 136, which is at least partially sealed by suction cup ring 142, enables lifting of the object by engagement with the suction cup 140. In this regard, vacuum may be applied via only outer cup 140 or may be applied via both outer cup 140 and inner cup 150 when outer cup 140 is deployed. Where irregularly shaped objects are expected to be engaged, it is preferred that inner suction cup 150 be recessed relative to contact ring 142. Control of inner suction cup 140 and telescoping tubes 132, 134 preferably are by conventional controlling means, as will be understood by persons familiar with employing automated suction cups for lifting objects.

FIG. 5 illustrates a second embodiment assembly 210 that includes a tubular housing 220 having a mounting end 222 at its proximal end that is opposite from the suction cups and that is adapted for mounting preferably to an end effector (not shown) or to any other structure, according to the particular parameters of the application. An inner telescoping tube assembly 230 includes at least one inner tube 232. In the embodiment shown in FIG. 5, inner tube 232 is the distal most telescoping tube. Additional telescoping tubes, as described for first embodiment assembly 110 may be employed. In the embodiment of the figures, a proximal tube 236 is fixed relative to housing 220.

Preferably, a linear actuator, shown schematically by reference numeral 290 in FIG. 5, has a proximal end that is affixed relative to housing 220 and a distal end that is operatively coupled to inner tube 232 such that actuator 290 can extend and then retract the suction cups at the distal end of inner tube 232. Actuator 290 can be as described for first embodiment actuator 190. Preferably, assembly 210 also includes a rotary actuator 292, which is illustrated schematically along with linear actuator 290 by a dashed line in FIG. 5 and described more fully below.

Assembly 210 includes an outer suction cup 240 and an inner suction cup 250. Inner suction cup 250 has a smaller diameter than outer suction cup 240 and is nestable or retractable within outer suction cup 240. In the embodiment shown in the figures, outer suction cup 240 is cup-like and includes a resilient contact ring 242, a cylindrical or somewhat conical sidewall 244, an end wall 246, and a ring 248 (FIG. 4). Inner suction cup 250 preferably is mounted to a distal end of distal tube 232, such as by screw threads or like means. Inner suction cup 250 includes a contact ring 252, a bellows-like sidewall 254, and threads 256 or other attachment means.

Assembly 210 has a pair of interlocks 260 and 270 to exchange or control the suction cups by coupling or engaging outer suction cup 240 with the distal end of inner tube 232 and, alternatively, with housing 220. An interlock 260 between outer suction cup 240 and housing 220 preferably includes ball detents. As illustrated in FIGS. 6 and 8, each ball detent interlock 260 includes a housing 262 that is threaded into holes in outer cup ring 248, a coil spring 264, a ball 266, and a recess 268 in the inboard surface of outer tube 220. Preferably, several (eight as shown in the figures) detents are located about the circumference of outer suction cup 240. Spring 264 is compressed such that it applies an outward, radial force on ball 266, and in that way presses ball 266 into recess 268. Preferably, recess 268 is a partial sphere to match the surface of ball 266.

An interlock 270, referred to as a twist lock, between outer suction cup 240 and inner tube 232 preferably includes lugs or tabs 272 extending radially outwardly from an outboard surface of inner tube 232, as best shown in FIG. 7. Tabs 272 are configured engage or ride in corresponding spiral or inclined threads or grooves 274 formed in ring 242 of outer suction cup 240, as best shown in FIG. 8. Thus, rotary actuator 292 may rotate inner tube 232 when outer suction cup 240 is proximate to housing 220 such that outer suction cup 240 is drawn upwardly (that it toward housing 220) by the screw action of tabs 272 in grooves 274. When twist lock 270 is engaged, outer suction cup 240 is coupled to inner tube 232. When twist lock 270 is disengaged (that is, tabs 272 are not within grooves 274), outer suction cup 240 remains coupled to housing 220 by the action of ball detent interlock 260, even while tube 232 is extended.

Thus, in operation, upon assembly 210 being positioned relative to an object, a controller (not shown) determines to deploy either the larger outer suction cup 240 or the smaller inner suction cup 250. The controller preferably bases the decision based on information about the object already known to the control system, according to conventional principles that will be understood by persons familiar with automated lifting of objects, such as in a fulfillment center.

If the object is determined by a control system to be small such that inner suction cup 250 is desired to be deployed to engage the object, rotary actuator 292 rotates tube 232 to thread tabs 250 out of engagement with grooves 254 (counter-clockwise in the embodiment shown in the figures when viewed from above). In this regard, outer suction cup 240 is restrained from rotation by detents 260 (or other means) during the actuation of rotary actuator 292. Balls 266 are engaged into recesses 268 to retain outer suction cup 240 with housing 220 while linear actuator 290 extends from its fully retracted position. Thus, inner tube 232 extends distally from housing 220 to deploy inner suction cup 250, which is then engaged with an object. Vacuum and controls are as described for first embodiment assembly 110.

If the object is determined by a control system to be large such that outer suction cup 240 is desired to be deployed to engage the object, rotary actuator 292 rotates tube 232 to thread tabs 250 into engagement with grooves 254 (clockwise in the embodiment shown in the figures when viewed from above). Upon inner tube 232 extension by linear actuator 290, outer suction cup 240 is deployed, as it is threaded onto tube 232 and released from ball detent interlock 260. Vacuum and controls are as described for first embodiment assembly 110

Figure 9:
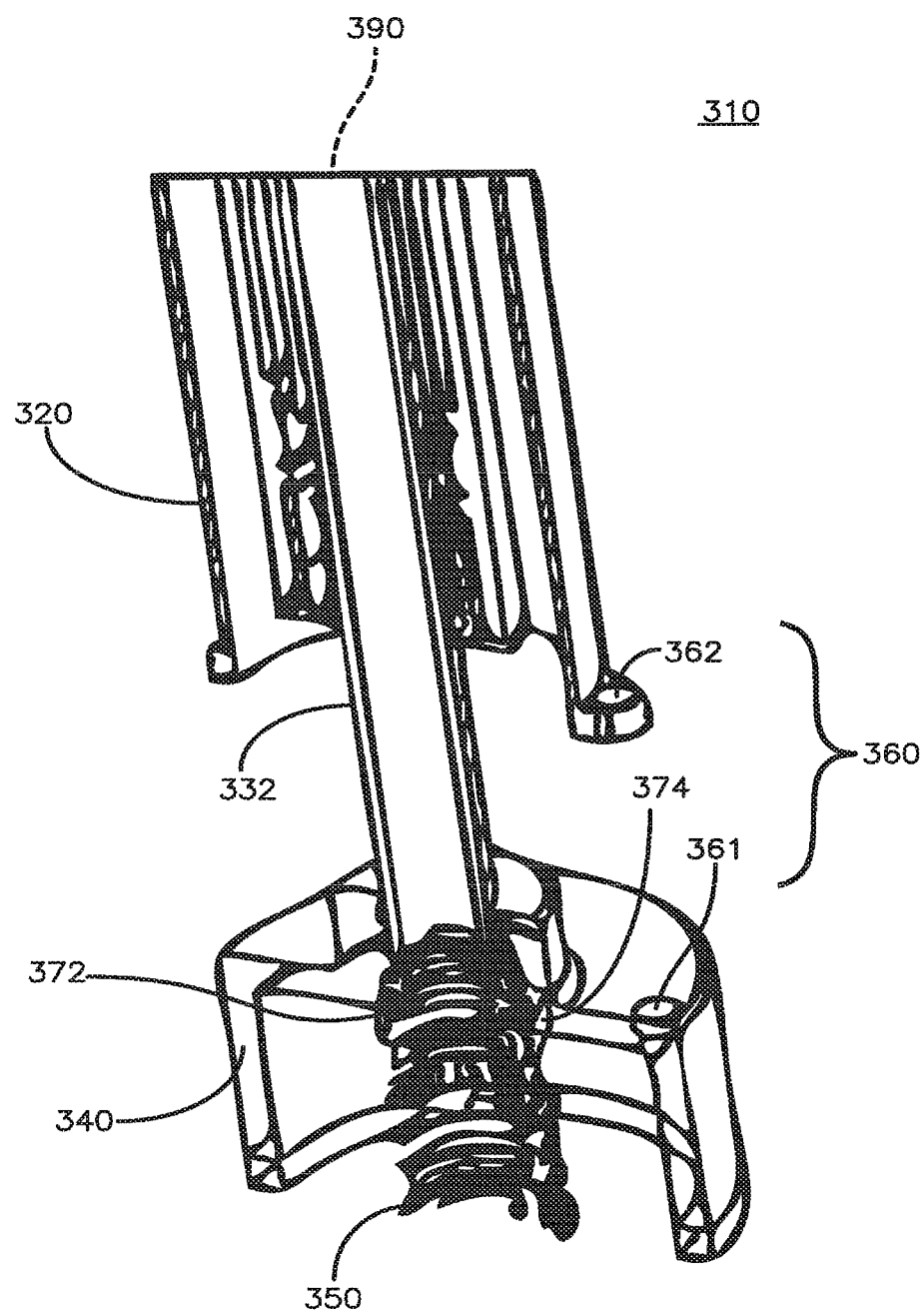
FIG. 9 is a perspective view of a third embodiment mechanism for exchanging and deploying suction cups, illustrating a large suction cup attached to the inner tube by a twist lock, with the components shown transparent.

FIG. 9 illustrates a third embodiment assembly 310 that includes a tubular housing 320 having a mounting end 322 at its proximal end that is opposite from the suction cups and that is adapted for mounting preferably to an end effector (not shown) or to any other structure, according to the particular parameters of the application. An inner telescoping tube assembly 330 includes at least one inner tube 332. In the embodiment shown in FIG. 9, inner tube 332 is the distal most telescoping tube. Preferably, a linear actuator 390, rotary actuator 393, outer suction cup 340, inner suction cup 350, and twist interlock 370 (including tabs 372 and grooves 374) are as described for second embodiment linear actuator 290, rotary actuator 293, outer suction cup 240, inner suction cup 250, and twist interlock 270 (including tabs 272 and grooves 274).

Assembly 310 has an interlock 360 between outer suction cup 340 and housing 320. Interlock 360 preferably includes opposing electromagnets, including magnets 361 on suction cup 340 and opposing magnets 362 on housing 320. As illustrated in the FIG. 9, housing magnets 362 are located on an outer periphery of housing 320; outer suction cup magnets 361 are on a rear or proximal side of the end wall outer suction cup 340. Because the electromagnets 361, 362 can be energized to engage or disengage suction cup 340 from housing 320 (as described for first embodiment 110), the interlock 360 is referred to herein as an active interlock. It is understood that the active interlock is not limited to electronic actuated magnets, but rather encompasses any type of electric, electro-mechanical, or mechanical interlock, without limitation.

In operation, upon assembly 310 being positioned relative to an object, a controller (not shown) determines to deploy either the larger outer suction cup 340 or the smaller inner suction cup 350. The controller preferably bases the decision based on information about the object already known to the control system, according to conventional principles that will be understood by persons familiar with automated lifting of objects, such as in a fulfillment center.

If the object is determined by the control system to be small such that inner suction cup 350 is desired to be deployed to engage the object, rotary actuator 392 rotates tube 332 to thread tabs 350 out of engagement with grooves 374. In this regard, outer suction cup 340 is restrained from rotation by the action of the magnets 370 while magnets 371, 372 are engaged to retain outer suction cup 340 with housing 320. As actuator 390 extends from its fully retracted position, inner tube 332 extends distally from housing 320 to deploy inner suction cup 350, which is then engaged with an object. Vacuum and controls are as described for second embodiment assembly 210.

If the object is determined by the control system to be large such that outer suction cup 340 is desired to be deployed, twist lock 370 couples outer suction cup 340 to inner tube 332 by the rotary motion of actuator 392 (in an opposite rotational direction from the disengaging direction). Magnets 371, 372 are then de-energized such that the extension of tube 332 by linear actuator 390 extends outer suction cup 340 relative to housing 320. Thus, outer suction cup 340, with inner tube 332, extends distally from housing 320 to deploy outer suction cup 340, which is then engaged with an object. Inner suction cup 350 may be recessed relative to outer suction cup 340 as described for second embodiment 210.

Alternatively, magnets 371 and 372 may be conventional magnets that are not electronically actuated such that proximity, as when outer suction cup 340 is located in contact with housing 320, creates an attractive force that retains outer suction cup 340 against housing 340. In this regard, the assembly would have a pair of passive interlocks. The attractive force is broken when the outer suction cup 340 is engaged by the tab and groove structure of interlock 360 and the attractive force is re-engaged and the twist lock 360 is disengaged to enable inner tube 332 to deploy, as needed.

FIGS. 10 through 15 illustrate a fourth embodiment of an assembly or mechanism 410 to exchange two suction cups, such that either a large suction cup or small suction cup can be deployed as needed. Assembly 440 includes a tubular housing 420 having a mounting end (not shown in the figures) at its proximal end that is opposite from the suction cups and that is adapted for mounting preferably to an end effector (not shown) or to any other structure, according to the particular parameters of the application. In the embodiment shown in the figures, an inner tube 432 is the distal most telescoping tube and an intermediate tube 434 is concentric with and outboard of inner telescoping tube 432, and concentric with and inboard of outer housing 420.

Preferably, a linear actuator, shown schematically by reference numeral 490 in FIG. 10, has a proximal end that is affixed relative to housing 420 and a distal end that is operatively coupled to inner tube 432 such that actuator 490 can extend and then retract the suction cups at the distal end of inner tube 432. A second actuator, illustrated schematically by reference numeral 492 in FIG. 10, has a fixed proximal end and it operatively coupled to housing 420 such that actuator 492 can extend and then retract housing 420 relative to inner tube 432, as explained more fully below. Actuator 490 and/or actuator 492 can be a pneumatic actuator (preferred), a hydraulic actuator, a mechanical actuator such as an ACME screw, or any other mechanism capable of extension and retraction upon being energized, without limitation. Assembly 410 includes an outer suction cup 440 and an inner suction cup 450. Inner suction cup 450 has a smaller diameter than outer suction cup 440 and is nestable or retractable within outer suction cup 440. In the embodiment shown in the figures, outer suction cup 440 is tapered and includes a resilient contact ring 442, a conical sidewall 444, an end wall 446, and a ring 448 (FIG. 4) that is threaded onto intermediate tube 434. Inner suction cup 450, which is omitted from the figures for clarity, is preferably mounted to a distal end of distal tube 432, such as by screw threads or like means. Inner suction cup 450 can be as described for first inner suction cup 150.

A spring 494 around inner tube 432 has a lower end that acts on an upper surface of outer suction cup 440 and an upper end that acts on a housing 496.

Assembly 410 has a pair of passive interlocks 160 and 170 to exchange or control the suction cups by coupling or engaging outer suction cup 440 with the distal end of inner tube 432 and, alternatively, with housing 420. Interlocks 160 and 170 are provided by a single ball detent that employs a recess in the outboard surface of inner tube 432 and a recess in an inboard surface of housing 420.

Interlock 460 between intermediate tube 434 and distal inner tube 432 preferably includes a ball 466 and a recess ring 468 in the outboard surface of inner tube 432. Preferably, several (such as six or eight) balls 466 are located about the circumference of inner tube 432. Interlock 470 between intermediate tube 434 and housing 420 preferably includes ball 466 and a recess ring 478 in the inboard surface of housing 420. In the embodiment shown, the force required to overcome inner interlock 460 is greater than the force required to overcome outer interlock 470.

As illustrated in FIG. 12, ball 466 is engaged in with interlock 460 to retain intermediate tube 434 with inner tube 432. FIG. 12 illustrates the outer suction cup 140 partially deployed by actuator 490 as housing 420 is held in place such that ball detent 170 is disengaged and ball detent 460 is engaged (that is, ball 466 is in groove 468 and out of groove 478). As best shown in FIG. 13, as outer suction cup 140 is deployed, the spring force of spring 494 against housing 496 keeps housing 496 in position over ball 466 to retain ball 466.

To begin the deployment of inner tube 432, actuator 492 drives outer tube 420 down relative to inner tube 432 and intermediate tube 434 until recess ring 478 engages ball 466, which moves housing 494 out of engagement with ball 466. Then, housing 420 is held in place while actuator 490 extends inner tube 432 to extend inner suction cup 550, as illustrated in FIGS. 14 and 15.

If the object is determined by a control system to be small such that inner suction cup 450 is desired to be deployed, second actuator 492 moves housing 420 relative to intermediate tube 434 to engage outer detent 470 (that is, such that ball 466 is in housing ring 478) to retain outer suction cup 440 with housing 420. Then linear actuator 490 applies a downward force to extend inner tube 432 and inner suction cup 450 while outer suction cup 440 is retained by outer interlock 470 and ball 466 is retained by housing 496. In this regard, when inner tube 432 and housing 420 are positioned such that rings 468 and 478 are aligned and ball 466 can simultaneously reside at least partially in each one of rings 468 and 478 simultaneously, inner tube 432 is free or held by a very small detent force of interlock 470 because ball 466 can move outwardly slightly into housing ring 478, thus facilitating release and extension of inner tube 432.

If the object is determined by a control system to be large such that outer suction cup 440 is desired to be deployed, one or both actuators move housing 420 upwardly relative to intermediate tube 434 (or intermediate tube 434 downward relative to housing 420) to disengage ball 466 from ring 478, such as (without limitation) by aligning rings 468 and 478, then moving housing 420 relatively upwardly to disengage outer interlock 470 (that is, ball 466 is retained in inner tube ring 468 and free from outer tube ring 478, as illustrated in FIG. 12). Housing 496 preferably is cylindrical and dimensioned to retain ball 466 in inner tube ring 468. Because inner ball detent 460 retains inner tube 432 with intermediate tube 434, the extension of inner tube 432 by the action of linear actuator 490 deploys outer vacuum tube 450. Vacuum and control is as described for first embodiment assembly 110.

Throughout the description, objects are referred to as small and large. It is not intended that the disclosure is limited to any size objects. Rather, the terms "small" and "large" are used only for relative comparison of the objects, and when applicable the suction cup size or diameter. Accordingly, a "small" object may be objectively big, or a "large" object may be objectively small, so long as the relative relationship between the sizes is consistent. Further, the invention is illustrated employing a pair of suction cups, but the present invention is not limited to two suction cups, as the principles of the present invention may be employed with interlocks to exchange more than two suction cups.

The particular embodiments disclosed are used to illustrate aspects of the present invention. It is not intended that the present invention be limited to the particular structure and/or function of the embodiments. Rather, it is intended that structure and function of any one of the embodiments can be shared with other ones of the embodiments disclosed. Further, it is intended that the scope of the claims be the measure of the invention, as the disclosed structure and function are intended merely to be specific examples of the general principles, as claimed.

What is claimed is:

1. A method for lifting an object with a multiple suction cup apparatus, the apparatus including a housing, an extendible tube within the housing, an outer suction cup, and an inner suction cup; the method comprising:
   determining by a controller to engage at least one of an outer suction cup and an inner suction cup for attaching to an object; and
   deploying either the inner suction cup on a distal end of an extendible tube or the outer suction cup on the distal end of the extendible tube based on the determination by the controller.

2. The method of claim 1 further comprising sending a signal from the controller to a housing interlock to retain the outer suction cup relative to the housing at a time when deploying the inner suction cup.

3. The method of claim 1 further comprising sending a signal from the controller to a housing interlock to release the outer suction cup to enable deploying the outer suction cup.

4. The method of claim 2 wherein the housing interlock comprises an active interlock.

5. The method of claim 2 further comprising a second interlock, the second interlock locking the outer suction cup to the extendible tube.

6. The method of claim 5 wherein the second interlock comprises a ball detent.

7. A suction cup assembly, comprising:
a housing configured to be fixed to a structure;
a tube movable relative to the housing between an extended position and a retracted position;
an outer suction cup movably coupled to the tube;
an inner suction cup couple to the distal end of the tube;
wherein in a first configuration the tube deploys the inner suction cup past the outer suction cup in a first position on the tube and second configuration in which the outer suction cup is coupled in a second position proximate the distal end of the tube such that the outer suction cup is deployed.

8. The suction cup assembly of claim 7 wherein the inner suction cup is nestable within the outer suction cup.

9. The suction cup assembly of claim 7 wherein the tube is configured to transmit vacuum to the inner suction cup in the first configuration and to the outer suction cup in the second configuration.

10. The suction cup assembly of claim 7 further comprising a housing interlock adapted for releasably engaging the outer suction cup to the housing when the outer suction cup is in the first position.

11. The suction cup assembly of claim 7 wherein the housing interlock comprises an active interlock.

12. The suction cup assembly of claim 11 wherein the housing interlock includes an electromagnet and wherein a housing interlock force required to overcome the electromagnets is greater than an extendible tube interlock force.

13. The suction cup assembly of claim 7 further comprising a tube interlock that locks the outer suction cup to the distal end of the tube.

14. The suction cup assembly of claim 12 wherein the electromagnets are adapted such that when energized create the housing interlock force, and when de-energized enable the outer suction cup to release from the housing.

15. The suction cup assembly of claim 7 further comprising an actuator coupled to the tube, the actuator configured to move the tube between the extended position and the retracted position.

16. A robotic assembly for moving objects, comprising:
an end effector;
a housing coupled to the end effector;
an actuator disposed within the housing; and
a suction assembly comprising:
a first suction cup in communication with the actuator; and
a second suction cup within the first suction cup in communication with the actuator,
wherein the first suction cup and the second suction cup are independently deployable.

17. The robotic assembly for moving objects as recited in claim 16 further comprising an extendible tube coupled between the actuator and the first and second suction cups.

18. The robotic assembly for moving objects as recited in claim 17 further comprising vacuum source coupled to the extendible tube.

19. The robotic assembly for moving objects as recited in claim 17 further comprising a controller in communication with the actuator and configured to cause the actuator to move the extendible tube to deploy the first suction cup or the second suction cup.

20. The robotic assembly for moving objects as recited in claim 16 further comprising a locking mechanism configured to lock the first suction cup during deployment of the second suction cup.

\* \* \* \* \*